United States Patent [19]
Scott

[11] 3,804,504
[45] Apr. 16, 1974

[54] MINI-THEATER

[76] Inventor: Milton B. Scott, 1027 Summit Dr., Beverly Hills, Calif. 94708

[22] Filed: Sept. 18, 1972

[21] Appl. No.: 289,792

[52] U.S. Cl............... 353/77, 353/119, 353/75
[51] Int. Cl. ........................................ G03b 21/28
[58] Field of Search ............ 353/74, 71, 72, 77, 78, 353/119, 97

[56] References Cited
UNITED STATES PATENTS

| | | | |
|---|---|---|---|
| 1,840,920 | 1/1932 | Spaulding | 353/79 |
| 3,475,087 | 10/1969 | Busch | 353/79 |
| 3,194,113 | 7/1965 | Knus | 353/75 |
| 3,199,403 | 8/1965 | Moore | 353/78 |

FOREIGN PATENTS OR APPLICATIONS

| | | | |
|---|---|---|---|
| 370,897 | 1/1907 | France | 353/78 |
| 1,011,925 | 4/1952 | France | 353/77 |
| 1,169,753 | 9/1958 | France | 353/76 |
| 380,968 | 9/1923 | Germany | 353/77 |

*Primary Examiner*—Harry N. Haroian

[57] ABSTRACT

A mini-theater for use in projecting images comprising a readily portable housing adapted to support a projector and having a rearwardly disposed mirror and an upwardly and forwardly disposed rear projection screen, wherein the housing proper is a one-piece molded plastic structure having a projected light inlet positioned to direct rays to the mirror and thence to the rear of the screen, a screen opening across which a screen is mounted with a cowl about the opening which serves as a light shield and is detachably mounted on the housing and detachably secures the screen. The screen opening is large enough for the insertion of the mirror therethrough. The housing has a lower portion upon which a projector is receivable and which has locally depressed areas to removably receive the leg elements of a projector, the shape of the housing and arrangement of the functional parts thereof combining compactness and utility, as well as strength.

3 Claims, 5 Drawing Figures

PATENTED APR 16 1974

3,804,504

SHEET 2 OF 2

MINI-THEATER

This invention relates to an image projecting device for use in visual education. It is a portable device particularly adaptable for use with a motion picture projector and is a valuable aid in the instruction of adults and children in many field, such as in the instruction of salesmen, technicians and schoolchildren, as well as in the presentation of material to prospective customers and clients.

It is an object of the invention to provide a mini- theater which is primarily molded in one-piece and shaped to provide a compact structure with ample strength to support a motion picture projector and to withstand movement from one location to another without damage.

Another object of the invention is to provide a device of the class described with an aperture through which images are viewed on a rear projection screen located across the aperture, the images being reflected from a projector by a mirror mounted within the housing rearwardly of the rear projection screen and in which the screen is conveniently removably mounted so the mirror can be initially installed through the screen opening.

A further object is to provide a housing having an internal mirror behind a rear projection screen wherein the screen is removably held across an opening in the housing by means of an external light shielding cowl so that the mirror can be removed through the screen opening for cleaning or replacement as required.

A further object is to provide a housing so shaped that a projector can be conveniently supported by the housing to provide a compact unit, the housing being provided with means for supporting and properly positioning the projector in position to project rays through a projection opening to the mirror and thence by reflection to the rear projection screen.

The above and other objects will more fully appear from the following description in connection with the accompanying drawings.

Figure 1:
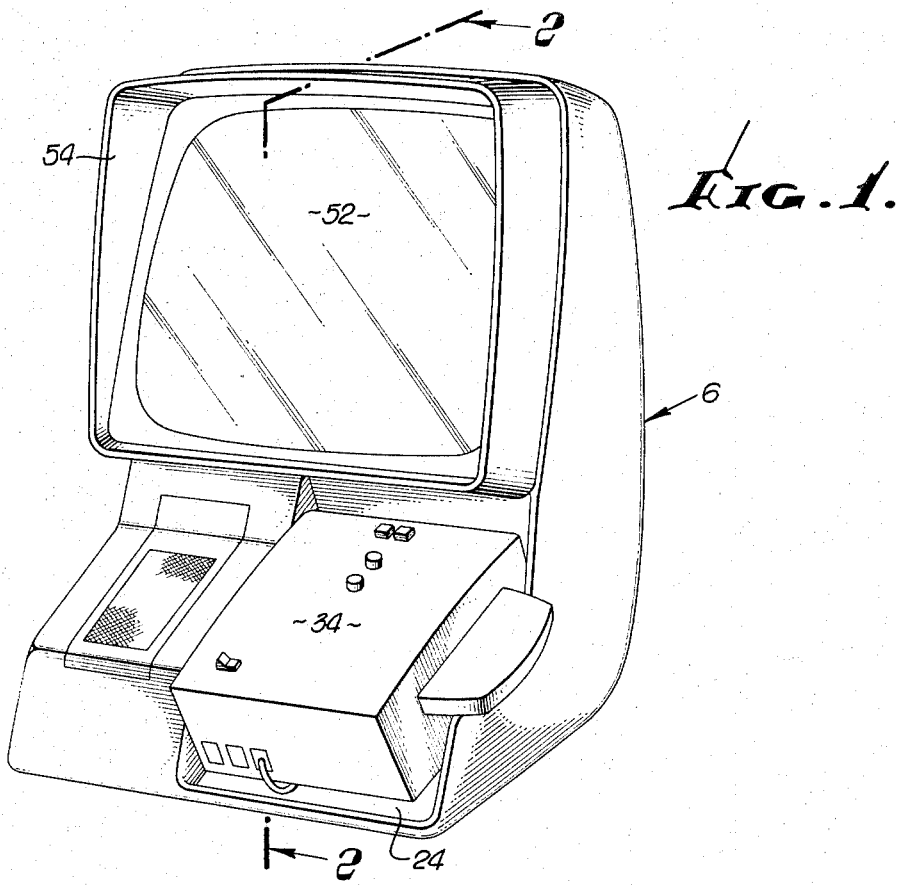
FIG. 1 is a perspective view of an embodiment of the invention with a projector mounted thereon.
Figure 3:
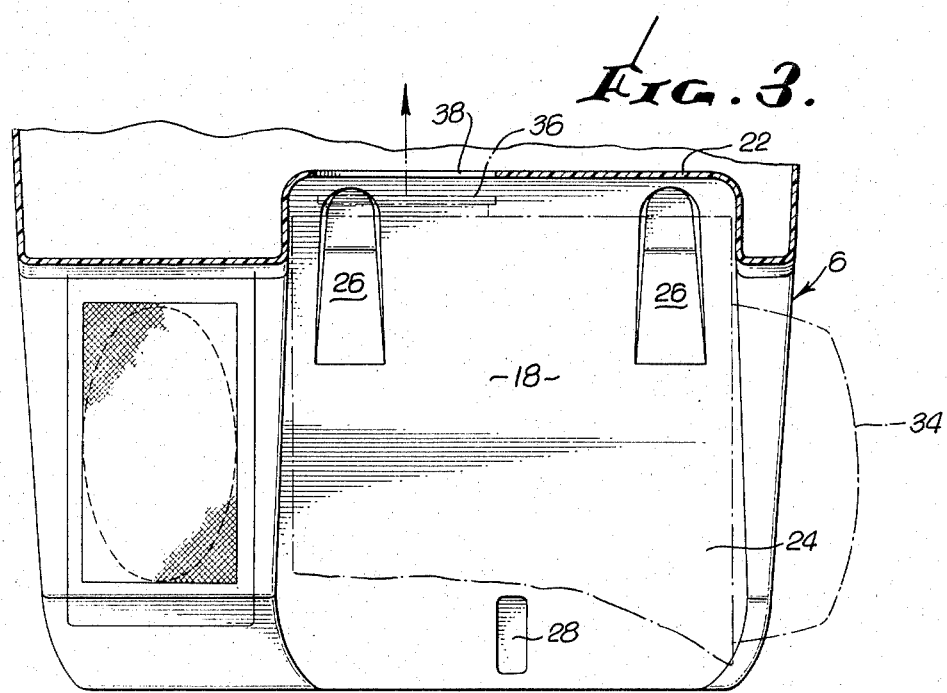
FIG. 3 is a section taken approximately on the line 3—3 of FIG. 2.
Figure 2:
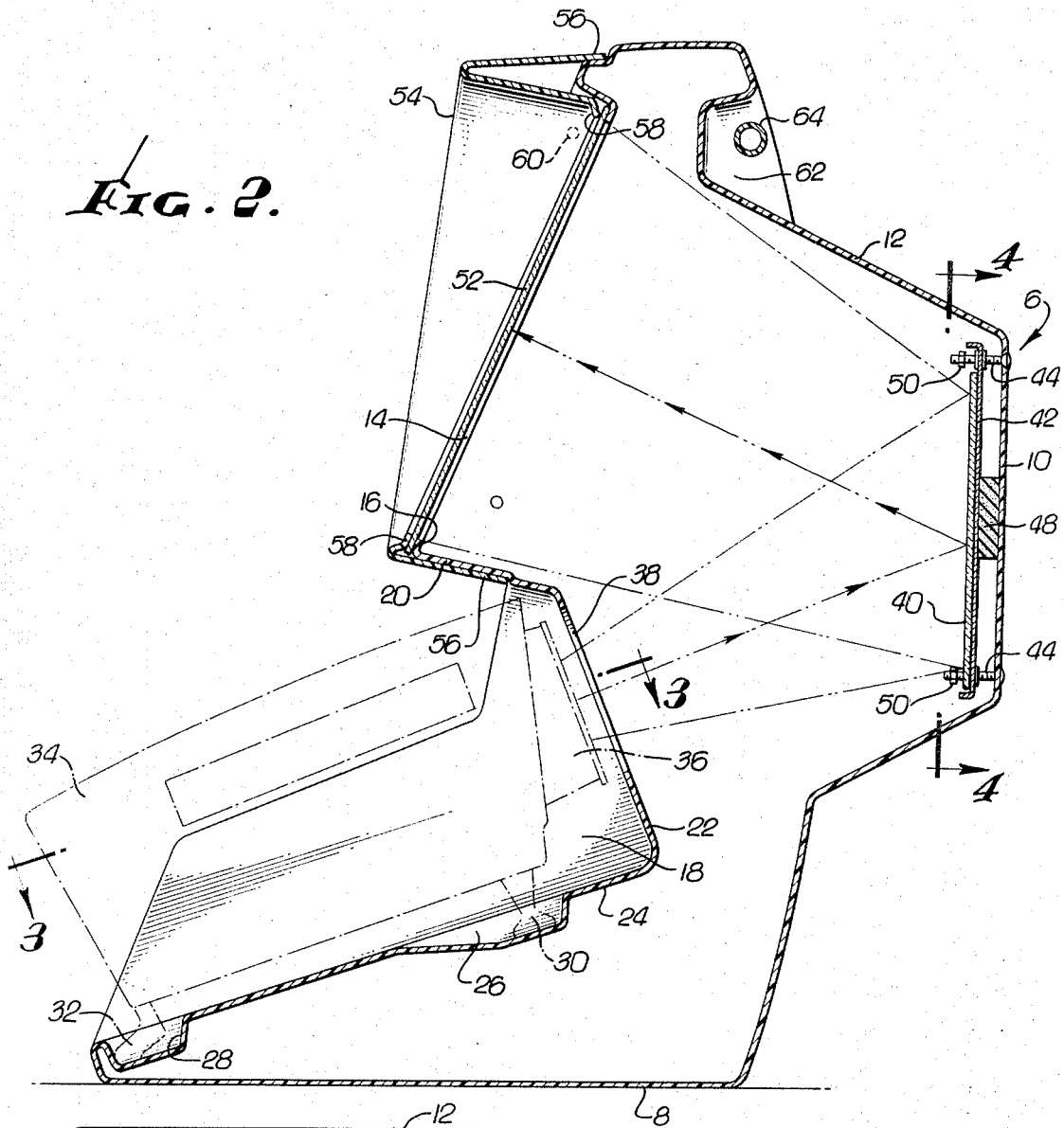
FIG. 2 is an enlarged sectional view taken approximately on the line 2—2 of FIG. 1.
Figure 4:
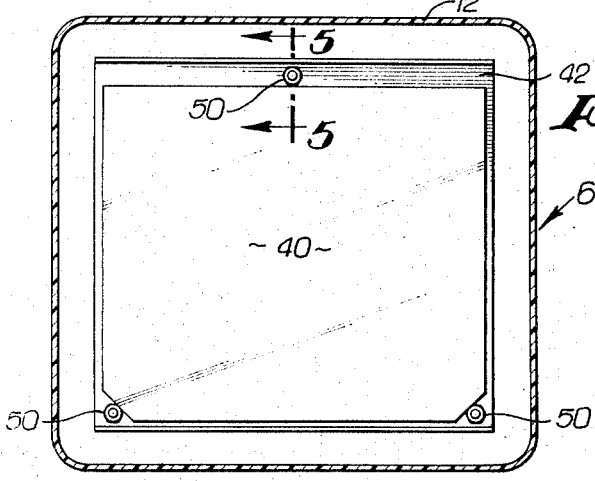
FIG. 4 is a section taken approximately on the line 4—4 of FIG. 2.
Figure 5:
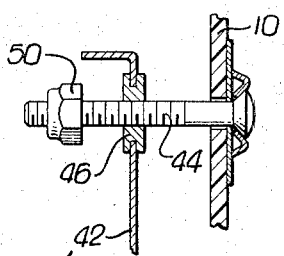
FIG. 5 is an enlarged sectional detail taken approximately on the line 5—5 of FIG. 4.

There is shown a housing 6 which preferably is of a suitable plastic material formed by rotational molding, as distinguished from vacuum molding, since the materials suitable for rotational molding are more rigid and nonflexible than those used in vacuum molding of articles of this size and having unusual contours. The housing has a bottom 8, a rear wall 10, a top wall 12 and an upper forward portion having an opening 14 defined by a perimeter flange 16. The forward vertical intermediate portion of the housing is indented rearwardly to provide a recess 18 defined by a downwardly and rearwardly slanting upper wall 20, a more sharply downwardly and rearwardly slanting intermediate wall 22 and a forwardly and rearwardly slanting bottom wall 24. This latter wall portion 24 is provided with locally depressed portions 26 and 28 to respectively receive the forward legs 30 and rear legs 32 of a projector 34. The projector in FIG. 2 is shown provided with a lens portion 36 adapted to direct light rays through an opening 38 to a mirror 40 mounted on the inner side of the rear wall 10 of the housing 6. The mirror is suitably mounted as by an adhesive on a metal plate 42. Mounting bolts 44 extend through the rear wall of the casing and through grommets 46 carried by the metal plate 42. Interposed between the housing back wall 10 and the metal plate 42 is a yielding pad 48 which may be of rubber-like material. Nuts 50 on the bolts 44 can be adjusted to tilt the mirror 40 at a proper adjusted angle to cause light rays from the projector 34 to be properly directed against the rear of a rear projection screen 52 which lies over the opening 14 and against the flange 16 which defines said opening.

Around the opening 14 and lying in front of the screen 52 is a cowl 54. The cowl in general comprises an open frame having an outer rim portion 56 and an inner rim portion 58. The cowl may be removably secured to the housing by screws or bolts 60 which are generally indicated in FIG. 2. It is to be noted that the inner rim 58 of said cowl bears against the outer edge portion of the screen 52 and is adapted to clamp the screen between it and the perimeter flange 16 with a resultant clamping action by reason of the elasticity of the material of the said inner rim 58 of the cowl. Thus, the cowl 54 can be removed conveniently and quickly and the screen 52 likewise removed to give access to the mirror 40 and its mounting nuts 50. Thus, the screen can be tilted to properly positionally adjust the same or it can be removed for replacement or cleaning, removal being had through the screen opening 14.

If desired, a recess 62 can be formed in the upper rearwardly facing portion of the housing to accommodate an integrally formed tubular carrying handle 64.

From the foregoing it will be seen that I have provided a mini-theater or projection housing for use with a portable projector which is quite compact, particularly by reason of the recess 18 which permits the upper forward portion of the housing to overhang a part of the projector and wherein the projector is securely supported by the housing by reason of the local depressions 26 and 28 for the forward and rear legs of the housing, resulting in the projector being entirely supported by said housing. The housing also has the feature of the light reflecting screen 40 which directs projected rays against the rear screen 52 and wherein the light shielding cowl and screen can be quickly and easily removed to give access to the mirror.

It should of course be understood that various changes can be made in the form, detail, arrangement and proportions of the device without departing from the spirit of the invention.

I claim:

1. A mini-theater comprising a self- contained assembly for projecting images from a projector onto a screen, wherein the improvement comprises: a one-piece molded plastic housing having an exterior lower projector supporting portion, slanting generally upwardly and rearwardly and having integral forward and rearward socket means therein for the front and rear legs of a projector, an interior rear portion providing a mirror mounting portion, an upper forward screen supporting portion overhanging the rear of the projector supporting portion, a mirror carried by said interior mirror mounting portion, the upper forward screen supporting portion having a forwardly facing screen opening therein defined by an integral perimetric flange having a forwardly directed surface, the screen opening being of a size to pass said mirror therethrough in mounting and dismounting the mirror, a rear projection screen covering the screen opening and lying against said perimetric flange and a light-shielding cowl detachably secured to the upper forward screen supporting portion about said screen opening, said cowl comprising an open frame having inner and outer rims, the outer rim being closely fitted about the upper forward screen supporting portion, and the inner rim engaging the edge of said screen and clamping the screen against said perimetric flange.

2. The structure in claim 1, and the material of the inner rim of said cowl being elastic, and said inner rim exerting elastic pressure against said screen.

3. The structure in claim 1, and said housing having a front bottom edge portion and having a front wall with an inwardly and rearwardly directed recess having a rearwardly and upwardly directed bottom wall and a merging rearwardly and downwardly directed rear wall, the rear wall of the recess having an aperture for the admission of projected light rays to said mirror from a projector located externally of the housing and having a portion extending into said recess, and said rearwardly and upwardly directed bottom wall being locally depressed to receive and retain against shifting the front and rear leg elements of a projector and position the projector relative to said aperture for projected light rays.

* * * * *